(12) United States Patent
Mayberry et al.

(10) Patent No.: US 11,679,445 B2
(45) Date of Patent: Jun. 20, 2023

(54) ULTRASONIC ADDITIVE MANUFACTURING OF COLD PLATES WITH PRE-FORMED FINS

(71) Applicant: Raytheon Company, Waltham, MA (US)

(72) Inventors: Travis Lee Mayberry, McKinney, TX (US); Cory Thomas, Tucson, AZ (US); Robert Arthur Condie, Dallas, TX (US); James S. Wilson, Dallas, TX (US)

(73) Assignee: Raytheon Company, Waltham, MA (US)

( * ) Notice: Subject to any disclaimer, the term of this patent is extended or adjusted under 35 U.S.C. 154(b) by 127 days.

(21) Appl. No.: 17/095,878

(22) Filed: Nov. 12, 2020

(65) Prior Publication Data
US 2022/0143736 A1  May 12, 2022

(51) Int. Cl.
| | | |
|---|---|---|
| *F28F 3/02* | (2006.01) | |
| *B33Y 10/00* | (2015.01) | |
| *B23K 20/10* | (2006.01) | |
| *B23K 20/233* | (2006.01) | |
| *B23P 15/26* | (2006.01) | |
| *F28F 9/02* | (2006.01) | |
| *F28F 9/18* | (2006.01) | |
| *B33Y 80/00* | (2015.01) | |

(Continued)

(52) U.S. Cl.
CPC ........ *B23K 20/103* (2013.01); *B23K 20/2333* (2013.01); *B23P 15/26* (2013.01); *F28F 3/025* (2013.01); *F28F 9/0224* (2013.01); *F28F 9/18* (2013.01); *B23K 2101/14* (2018.08); *B23K 2103/10* (2018.08); *B33Y 10/00* (2014.12); *B33Y 80/00* (2014.12)

(58) Field of Classification Search
CPC .............. B23K 20/103; B23K 20/2333; B23K 2101/14; B23K 2103/10; B23K 2101/36; B23K 2103/08; B23K 20/233; B23K 20/2336; B23K 20/10; B23P 15/26; F28F 3/025; F28F 9/0224; F28F 9/18; B33Y 10/00; B33Y 80/00
See application file for complete search history.

(56) References Cited

U.S. PATENT DOCUMENTS

| | | |
|---|---|---|
| 7,201,217 B2 | 4/2007 | Johnson et al. |
| 9,472,487 B2 | 10/2016 | Koontz et al. |

(Continued)

OTHER PUBLICATIONS

International Search Report and Written Opinion dated Mar. 10, 2022 for PCT/US2021/058900.

*Primary Examiner* — Rick K Chang
(74) *Attorney, Agent, or Firm* — Bachman & LaPointe, P.C.

(57) ABSTRACT

A method for making a cold plate includes the steps of positioning a finstock structure in a cavity of a substrate; and applying a cover to the finstock structure and substrate, wherein the applying step comprises ultrasonically additive manufacturing the cover to the substrate and the finstock structure, whereby the cover joins with the substrate and the finstock structure. The resulting cold plate assembly includes a substrate having a cavity, a finstock structure within the cavity, and a cover closing the finstock structure within the cavity, the cover being integrally joined to the substrate and to the finstock structure.

12 Claims, 3 Drawing Sheets

(51) Int. Cl.
 *B23K 103/10* (2006.01)
 *B23K 101/14* (2006.01)

(56) References Cited

U.S. PATENT DOCUMENTS

| | | |
|---|---|---|
| 2006/0266508 A1 | 11/2006 | Johnson et al. |
| 2015/0007969 A1 | 1/2015 | Pal |
| 2015/0352661 A1 | 12/2015 | Karlen et al. |
| 2017/0304964 A1 | 10/2017 | Andersen et al. |
| 2017/0356698 A1 | 12/2017 | Andersen et al. |
| 2018/0297144 A1 | 10/2018 | Mayberry et al. |
| 2018/0323047 A1 | 11/2018 | Strothers et al. |
| 2019/0039193 A1 | 2/2019 | Donovan et al. |
| 2021/0116188 A1* | 4/2021 | Roper .................. F28F 9/0202 |

* cited by examiner

ULTRASONIC ADDITIVE MANUFACTURING OF COLD PLATES WITH PRE-FORMED FINS

BACKGROUND OF THE DISCLOSURE

The disclosure relates to heat exchangers such as cold plates and, more particularly, to a method for manufacturing cold plates and a resulting cold plate assembly.

A cold plate is a heat exchanger having one or more cavities containing fins for enhancing heat exchange. The structures are used in numerous applications including densely packed electronics packages such as power supply and signal conditioning electronics.

Because of the shapes and materials involved, manufacture of cold plates is time consuming. The need remains for faster and more responsive manufacture of cold plates and cold plate assemblies.

SUMMARY OF THE DISCLOSURE

The disclosure relates to a method for making a cold plate, comprising the steps of: positioning a finstock structure in a cavity of a substrate; and applying a cover to the finstock structure and substrate, wherein the applying step comprises ultrasonically additive manufacturing the cover to the substrate and the finstock structure, whereby the cover joins with the substrate and the finstock structure.

In one non-limiting configuration, the finstock structure comprises material formed into a plurality of substantially parallel walls connected by folds, and wherein the step of ultrasonically additive manufacturing the cover to the substrate comprises applying a roller horn to the cover in a travel direction that is normal to the folds of the finstock structure, and an ultrasonic direction that is parallel to the folds of the finstock structure.

In another non-limiting configuration, the applying step joins the cover to the finstock structure along the folds of the finstock structure.

In still another non-limiting configuration, the substrate comprises an aluminum plate.

In a further non-limiting configuration, the cavity has a height, and the finstock structure has a finstock height that is greater than the height of the cavity.

In a still further non-limiting configuration, the finstock height is greater than the height of the cavity by between 0.001 and 0.005 inches (0.0254-0.127 mm).

In another non-limiting configuration, the finstock height is greater than the height of the cavity by between 0.002 and 0.003 inches (0.0508-0.0762 mm).

In still another non-limiting configuration, the applying step compresses the finstock height to the height of the cavity.

In a further non-limiting configuration, the cavity is open at opposite sides of the substrate, and the applying step comprises applying a first cover over the cavity at one side, and applying a second cover over the cavity at the opposite side.

In a still further non-limiting configuration, the applying step comprises applying the cover in multiple layers, wherein a first layer applied has a softer temper than subsequent layers.

In another non-limiting configuration, the finstock structure is pre-formed outside the cavity before the positioning step.

In still another non-limiting configuration, the applying step integrally joins the cover to the substrate and the finstock structure.

In another configuration, a cold plate assembly is disclosed comprising a substrate having a cavity, a finstock structure within the cavity, and a cover closing the finstock structure within the cavity, the cover being integrally joined to the substrate and to the finstock structure.

In one non-limiting configuration, the finstock structure comprises material formed into a plurality of substantially parallel walls connected by folds, and the cover is joined to the finstock structure along the folds.

In another non-limiting configuration, the substrate comprises an aluminum plate.

In still another non-limiting configuration, the cavity has a floor, and further comprises structure on the floor to hold the finstock in position relative to the floor.

In a further non-limiting configuration, the cover comprises multiple layers, wherein a first layer joined to the substrate and the finstock structure has a softer temper than subsequent layers.

BRIEF DESCRIPTION OF THE DRAWINGS

A detailed description of one or more embodiments of the disclosure follows, with reference to the attached drawings, wherein.

Like reference numbers and designations in the various drawings indicate like elements.

DETAILED DESCRIPTION

The disclosure relates to cold plate assemblies and, more particularly, to a method for ultrasonic additive manufacturing a cold plate with a pre-formed finstock structure, and also to the resulting cold plate assembly.

Figure 1:
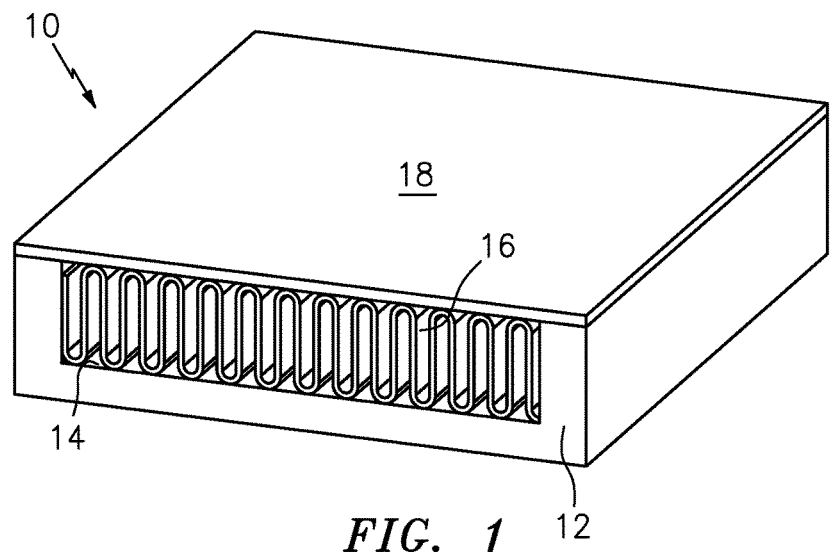
FIG. 1 schematically illustrates a cold plate assembly having a finstock structure in a cavity.

FIG. 1 shows a cold plate 10 in the form of a substrate 12, typically an aluminum plate, having a cavity 14 which can be machined or otherwise formed or defined into substrate 12. Cavity 14 contains a finstock structure 16 for facilitating function of cold plate 10 as a heat exchanger, and a cover 18 encloses finstock structure 16 in cavity 14. Brazing can frequently be utilized in the course of manufacturing a cold plate 10 such as is illustrated in FIG. 1. This brazing can be used, for example, to apply the cover over the finstock structure, and on other areas. Brazing has a substantial lead time, and this often drives the schedule for manufacture of the cold plate. In the present disclosure, manufacturing time is improved by applying the cover over the finstock using ultrasonic additive manufacturing. This greatly enhances the ability to demonstrate systems as needed, and then to manufacture such systems in an efficient and effective method that also produces a resulting cold plate having desirable properties.

Figure 2:
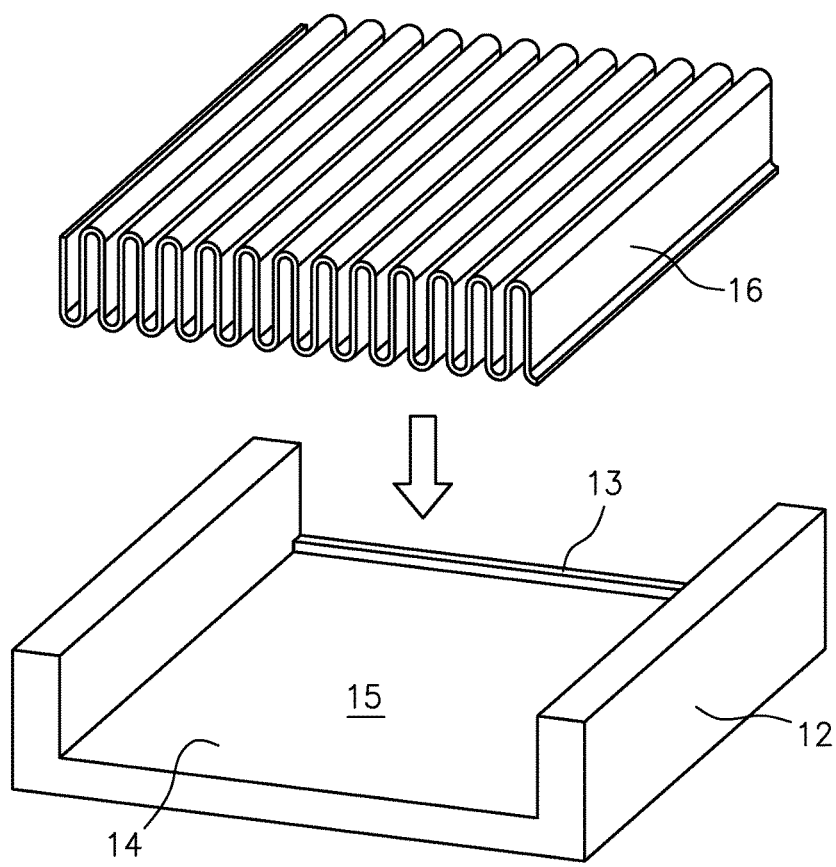
FIG. 2 schematically illustrates a step of a method as disclosed herein, wherein a pre-formed finstock structure is positioned in a cavity of a cold plate substrate.

FIG. 2 illustrates a substrate 12 having a cavity 14, and a finstock structure 16, in this non-limiting example a preformed finstock structure 16, that is placed in cavity 14. As shown, finstock structure can be a sheet of material that is formed into a back-and-forth parallel wall structure, with each wall joined to an adjacent wall through a fold at alternating sides of adjacent walls. While other finstock can also be utilized within the broad scope of this disclosure, finstock such as that illustrated in FIG. 2 is particularly well suited to the present method as the finstock can be preformed, or made in advance of assembly into the substrate. This pre-forming allows a very fine level of detail to be utilized in the finstock, which can be useful to obtain effective and efficient heat exchange as desired, in potentially small spaces.

Still referring to FIG. 2, substrate 12 can have a floor 15 in cavity 14 as shown, or the cavity can be open to the top and bottom. In cases where substrate 12 has a floor 15, it can be useful to have structure such as ridge 13 which can be positioned on floor 15 to hold substrate 16 in a desired location relative to cavity 14 and substrate 12. In addition to structural integrity of the assembly after manufacture, this added structure can also be useful during manufacture as will be described below.

Figure 3:
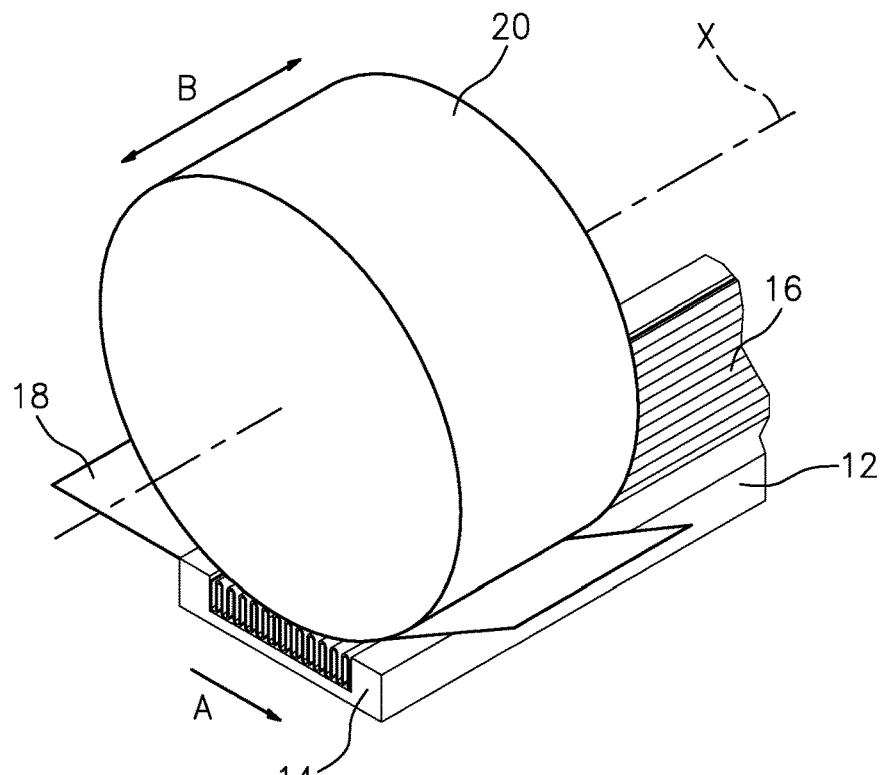
FIG. 3 schematically illustrates a further step of a method as disclosed herein wherein ultrasonic additive manufacturing is used to apply a cover over the finstock structure in the cavity.

FIG. 3 illustrates substrate 12, with finstock structure 16 in cavity 14, and a sheet 18 of cover material positioned over substrate 16 in cavity 14. In this step, cover 18 is being ultrasonic additively manufactured to substrate 12 and finstock structure 16.

In FIG. 3, a roller 20 is illustrated and represents the ultrasonic additive manufacturing step. Ultrasonic additive manufacturing can be performed using a roller or horn having a textured surface. The horn rotates around an axis X to move in a traveling direction shown by arrow A, and is vibrated at a high frequency along axis X, substantially normal to the direction of travel, as illustrated by arrow B. The side to side vibration breaks oxide layers on the materials being joined, in this case the surfaces of the cover and the underlying substrate and finstock, to create a strong bond or weld. This joining removes any boundary between the substrate and cover, and between the finstock and cover, such that these components are integrally joined together. Typically, the material being added as cover 18 can be referred to as tapes, and these tapes can be applied in multiple layers as needed.

Figure 4:
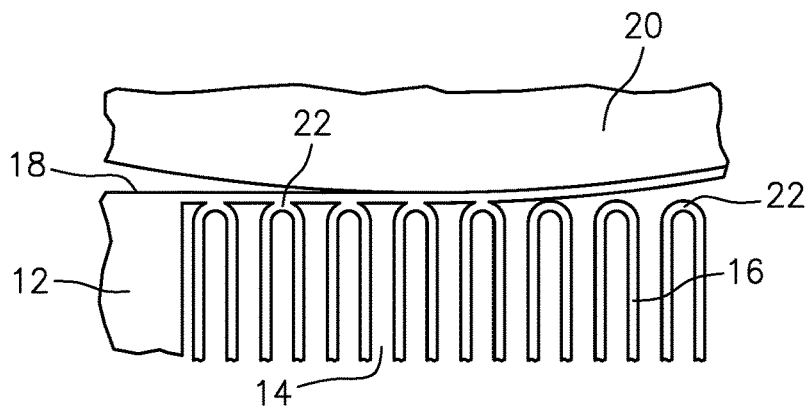
FIGS. 4 and 5 schematically illustrate joining of the material of the cover with that of the substrate and finstock structure.
Figure 5:
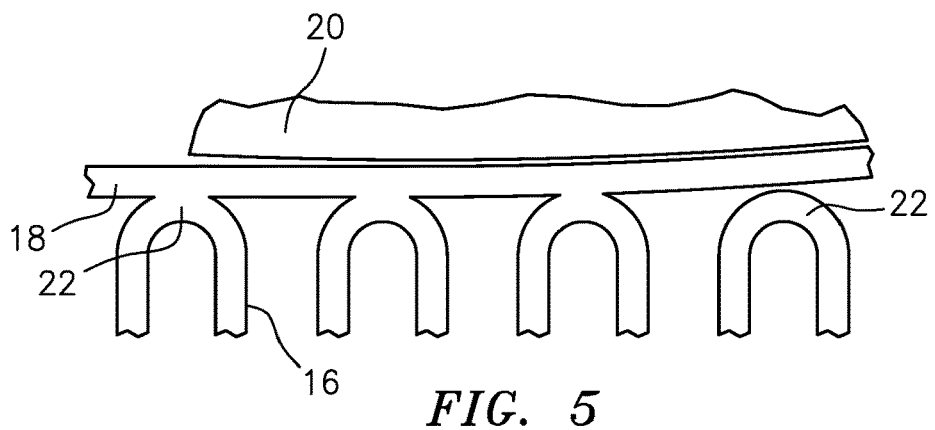

FIG. 4 schematically illustrates an enlarged portion of substrate 12, finstock structure 16 and cover 18 during the process, and shows roller 20 partially through a pass over cover 18. As shown, the material of cover 18 is joined with substrate 12 and also with an upper portion or area of the folds 22 of finstock structure 16 (See also FIG. 5). After being subjected to ultrasonic additive manufacturing, cover 18 is integrally joined to the underlying material.

Figure 6:
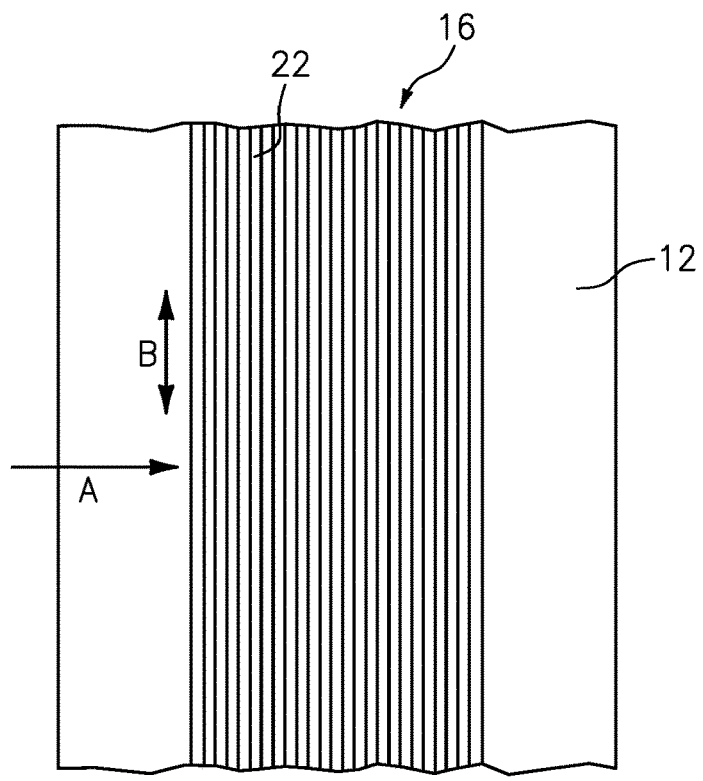
FIG. 6 further illustrates aspects of the ultrasonic additive manufacturing as disclosed herein.

FIG. 6 further illustrates relevant parameters of the ultrasonic additive manufacturing step, and shows a top view of a substrate 12 containing a pre-formed finstock structure 16 in a cavity 14. In FIG. 6, folds 22 of the finstock structure 16 are shown in this case running along a long dimension of cavity 14. FIG. 6 also shows a particularly useful orientation of travel direction and vibration direction of the ultrasonic additive manufacturing horn relative to the orientation of folds 22. Specifically, it has been found advantageous to have the travel direction A be substantially perpendicular or normal to folds 22, and to have vibrations of the horn, shown at arrow B, substantially parallel to folds 22. This allows for a good bonding of the cover to the finstock structure, and can create a high thermal conductivity path, with low thermal resistance, for heat travel from the source into the fluid or other heat sink. If good bonding is not achieved between the fin and substrate or cover, a high thermal resistance path is present which will result in a higher temperature rise between coolant and heat source.

When the vibration direction is perpendicular to folds 22, excessive bending of the fins during bonding takes place, and this can interfere with the quality of the bond. Thus, in one non-limiting configuration, the vibration direction can advantageously be angled relative to folds 22 by no more than 45 degrees, preferably by no more than 30 degrees, and most preferably within 10 degrees of parallel, which is referred to as substantially parallel.

In configurations where cavity 14 has a floor 15, it should be noted that during application of cover 18 to substrate 12 and finstock structure 16, vibrations also pass through finstock structure 16 and can result in joining of the material of the finstock structure, in this case folds at the bottom of the structure, to the floor as well, resulting in a very robust assembly with finstock structure joined to both floor and cover.

Figure 7:
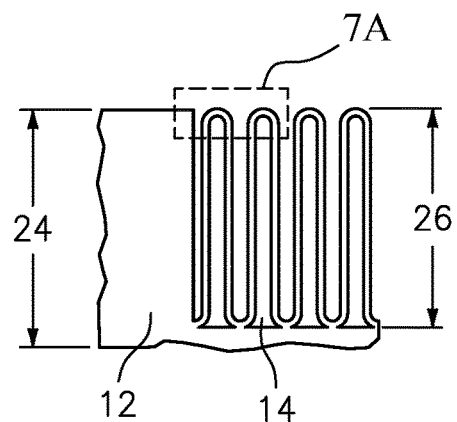
FIGS. 7 and 7A illustrate relative height of a finstock structure in a cavity before applying a cover according to the method disclosed herein.
Figure 7A:
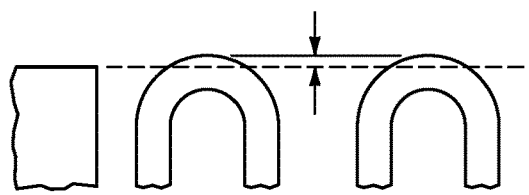

FIGS. 7 and 7A illustrate a further non-limiting configuration wherein a preformed finstock structure 16 has a height that is greater than a height of the cavity in which it is to be deployed. FIG. 7 shows substrate 12 with cavity 14 having a height 24, and finstock structure 16 having a height 26. As shown, height 26 can be slightly greater than height 24, for example by between about 0.001 and 0.005 inches (0.0254-0.127 mm), and desirably between 0.002 and 0.003 inches (0.0508-0.0762 mm). This results in a proud configuration of finstock in cavity before application of ultrasonic additive manufacturing, and a slight compression of finstock in cavity 14 during application of cover 18, all of which helps to provide a good quality bond of finstock structure (at folds 22) to cover 18 as desired. Of course, the ultrasonic additive manufacturing step compresses the height of the finstock down to the height of the cavity during welding.

The materials that are suitable for the substrate, finstock and cover can be chosen for positive ultrasonic welding combination. As one non-limiting example, aluminum and aluminum alloys have been found to be compatible with each other, as well as with copper, gold, iron, nickel, silver, tin and combinations or alloys thereof. Of course, other combinations are also possible within the scope of this disclosure.

Substrate 12 can be a plate of aluminum, aluminum alloy or other suitable material. Suitable examples of specific materials include but are not limited to aluminum, copper, stainless steel, titanium, and alloys and/or combinations thereof. The plate may have a thickness designed to meet the specific conditions in which it is to be installed. As one non-limiting example, substrate 12 may have a thickness of between about 1 and about 25 mm (0.0394-0.984 inches).

The substrate or plate can be machined or otherwise treated to form the cavity in which the finstock is to be installed. The finstock, when disposed in the cavity of such a substrate or plate, increases convection as desired while preventing bowing under pressure.

The finstock is in one configuration a preformed finstock formed from a flat strip of material and folded, bent or otherwise shaped into a back and forth or "ribbon candy" shape defined by substantially parallel walls connected at alternating ends by folds. Preforming of the finstock is advantageous as the finstock can be prepared more quickly, and also having a tighter pitch pattern than could be accomplished utilizing additive manufacturing processes. Thus, in one suitable configuration of the present disclosure, the finstock is preformed before being placed in the cavity of the plate.

The finstock can be prepared from any suitable material, preferably which is compatible with the material of the cover and substrate, for purposes of ultrasonic welding as discussed above. Thus, non-limiting examples of suitable finstock material can include aluminum, copper, stainless steel, titanium, and alloys and/or combinations thereof.

Finstock material can have a thickness of between about 0.004 and 0.020 inches (0.1016-0.508 mm).

The cover can be applied in one or more layers of sheets or tapes of compatible ultrasonic welding material. Suitable non-limiting examples of material that can be used for the cover include aluminum, copper, stainless steel, titanium and alloys and/or combinations thereof. Further, the layers to be applied can have different properties. For example, the first layer applied can have a relatively softer temper than later layers, as this provides for better quality bonding between the cover and underlying substrate and finstock.

It should be appreciated that the finstock can be formed having straight fins, wavy fins, lanced offset fins and any other shape as may be desired.

One or more embodiments of the present disclosure have been described. Nevertheless, it will be understood that various modifications may be made without departing from the spirit and scope of the invention. For example, different materials and configurations could be utilized, and warheads having different shapes may benefit from this disclosure. Accordingly, other embodiments are within the scope of the following claims.

What is claimed is:

1. A method for making a cold plate, comprising the steps of:
    positioning a finstock structure in a cavity of a substrate; and
    applying a cover to the finstock structure and substrate, wherein the applying step comprises ultrasonically additive manufacturing the cover to the substrate and the finstock structure, whereby the cover joins with the substrate and the finstock structure, wherein the finstock structure comprises material formed into a plurality of substantially parallel walls connected by folds, and wherein the step of ultrasonically additive manufacturing the cover to the substrate comprises applying a roller horn to the cover in a travel direction that is normal to the folds of the finstock structure, and an ultrasonic direction that is parallel to the folds of the finstock structure.

2. The method of claim 1, wherein the applying step joins the cover to the finstock structure along the folds of the finstock structure.

3. The method of claim 1, wherein the substrate comprises an aluminum plate.

4. The method of claim 1, wherein the cavity is open at opposite sides of the substrate, and wherein the applying step comprises applying a first cover over the cavity at one side, and applying a second cover over the cavity at the opposite side.

5. The method of claim 1, wherein the applying step integrally joins the cover to the substrate and the finstock structure.

6. A method for making a cold plate, comprising the steps of:
    positioning a finstock structure in a cavity of a substrate; and
    applying a cover to the finstock structure and substrate, wherein the applying step comprises ultrasonically additive manufacturing the cover to the substrate and the finstock structure, whereby the cover joins with the substrate and the finstock structure, wherein the cavity has a height, and wherein the finstock structure has a finstock height that is greater than the height of the cavity.

7. The method of claim 5, wherein the finstock structure comprises material formed into a plurality of substantially parallel walls connected by folds, and wherein the step of ultrasonically additive manufacturing the cover to the substrate comprises applying a roller horn to the cover in a travel direction that is normal to the folds of the finstock structure, and an ultrasonic direction that is parallel to the folds of the finstock structure.

8. The method of claim 6, wherein the finstock height is greater than the height of the cavity by between 0.001 and 0.005 inches (0.0254-0.127 mm).

9. The method of claim 6, wherein the finstock height is greater than the height of the cavity by between 0.002 and 0.003 inches (0.0508-0.0762 mm).

10. The method of claim 6, wherein the applying step compresses the finstock height to the height of the cavity.

11. A method for making a cold plate, comprising the steps of:
    positioning a finstock structure in a cavity of a substrate; and
    applying a cover to the finstock structure and substrate, wherein the applying step comprises ultrasonically additive manufacturing the cover to the substrate and the finstock structure, whereby the cover joins with the substrate and the finstock structure, wherein the applying step comprises applying the cover in multiple layers, and wherein a first layer applied has a softer temper than subsequent layers.

12. A method for making a cold plate, comprising the steps of:
    positioning a finstock structure in a cavity of a substrate; and
    applying a cover to the finstock structure and substrate, wherein the applying step comprises ultrasonically additive manufacturing the cover to the substrate and the finstock structure, whereby the cover joins with the substrate and the finstock structure, wherein the finstock structure is pre-formed outside the cavity before the positioning step.

* * * * *